US010944641B1

(12) United States Patent
Zacks et al.

(10) Patent No.: US 10,944,641 B1
(45) Date of Patent: Mar. 9, 2021

(54) SYSTEMS AND METHODS FOR APPLICATION TRAFFIC SIMULATION USING CAPTURED FLOWS

(71) Applicant: Cisco Technology, Inc., San Jose, CA (US)

(72) Inventors: David John Zacks, Vancouver (CA); Thomas Szigeti, Vancouver (CA); Tzahi Peleg, Holon (IL); David Tedaldi, Zurich (CH); Vikram Vikas Pendhar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/672,186

(22) Filed: Nov. 1, 2019

(51) Int. Cl.
*H04L 12/24* (2006.01)
*G06F 3/0484* (2013.01)
*H04L 12/26* (2006.01)
*H04L 12/859* (2013.01)

(52) U.S. Cl.
CPC ........ *H04L 41/147* (2013.01); *G06F 3/04847* (2013.01); *H04L 41/145* (2013.01); *H04L 41/22* (2013.01); *H04L 43/045* (2013.01); *H04L 47/2475* (2013.01)

(58) Field of Classification Search
CPC ..... H04L 41/147; H04L 41/145; H04L 41/22; H04L 43/045; H04L 47/2475
See application file for complete search history.

(56) References Cited

U.S. PATENT DOCUMENTS

| | | | |
|---|---|---|---|
| 7,890,473 B1* | 2/2011 | Wyett | G06F 11/3409 707/687 |
| 8,018,860 B1* | 9/2011 | Cook | H04L 41/145 370/218 |
| 8,670,329 B2 | 3/2014 | Sun et al. | |
| 8,824,282 B2 | 9/2014 | Singh et al. | |
| 9,350,622 B2 | 5/2016 | Smith et al. | |
| 9,439,081 B1* | 9/2016 | Knebl | H04W 16/18 |
| 10,313,203 B2 | 6/2019 | White et al. | |
| 2015/0295787 A1* | 10/2015 | Kakadia | H04L 43/062 370/236 |
| 2016/0359912 A1 | 12/2016 | Gupta et al. | |
| 2017/0272343 A1* | 9/2017 | Giles | H04L 43/16 |
| 2017/0272910 A1* | 9/2017 | Smith | H04W 4/021 |

\* cited by examiner

*Primary Examiner* — Viet D Vu
(74) *Attorney, Agent, or Firm* — Polsinelli PC

(57) ABSTRACT

Application performance can be simulated based on captured application-specific traffic flows through a managed network. Traffic flows may be captured across the managed network and associated with a particular application. The captured flows can be used to generate trend lines and models. The generated trend lines and models may be used to simulate application performance responsive to changes in network characteristics and provided to a user through a graphical user interface as a graph. The user may then adjust simulated network characteristics through the graphical user interface to perform various hypothetical network simulations.

20 Claims, 17 Drawing Sheets

DNA CENTER

✕ Design — 206
Model your entire network, from ??? and buildings to devices and ???, both physical and virtual, across campus, branch, WAN and cloud.
- Add ??? locations on the network
- Designate golden images for device families
- Create wireless profiles of SSIDs

Provision — 210
Provide new services to users with ???, speed and security across your enterprise network, regardless of network ???? and complexity.
- Discover and provision switches to ?????????? sites
- Provision WLCs and APs to ?????? sites
- Set up Campus Fabric across switches

Platform — 214
Use DNA-C Platform to unlock the full potential of DNA-C using APIs, integration capabilities and Data services
- View the API Catalog
- Configure DNA- to - Third Party integrations
- Schedule and Download - Data Sets and Reports

Tools — 216

⚙ Policy — 208
Use policies to complete and simplify network management, reducing cost and risk while speeding rollout of new and enhanced services
- Segment your network as Virtual Networks
- Create scalable groups to describe your critical assets
- Define segments from policies to meet your policy goals

Assurance — 212
Use proactive monitoring and insights from the network, devices, and applications to predict problems faster and ????? that policy and configuration changes achieve the ????????? internet and the user experience you want.
- Assurance Health
- Assurance ?????

| Discovery 302 Automatic addition of devices in controller inventory | Inventory 304 Add, update or delete devices that are managed by the controller | Topology 306 Visualize how devices are interconnected and how they communicate | Image Repository 308 Download and manage physical and virtual software images automatically |
| Command Runner 310 Allows you to run diagnostic CLIs against one or more devices | License Manager 312 Visualize and manage license usage | Template Editor 314 An interactive editor to author CLI templates | Network Plug and Play 316 A simple and secure approach to provision networks with a near zero touch experience |
| Telemetry 318 Telemetry Design and Provision | Data Sets and Reports 320 Access Data Sets, Schedule Data Extracts for Download in multiple formats like PDF Reports, CSV, Tables etc | | |

Screenshot 300D — Cisco DNA Center, Provision tab, Device Inventory:

| Device Name ▲ | Device Family | IP Address | Site | Serial Number | Uptime | OS Version | OS Image | Last Sync Status | Credential Status | Last Provisioned Time | Provision Status |
|---|---|---|---|---|---|---|---|---|---|---|---|
| asr1001-x.abc.inc | Routers | 10.10.22.74 | ...elbourne/MEL2 | FXS1932Q1SE | 25 days, 10:24:02.73 | 16.3.2 | asr1001x-univ... Tag Golden | Managed | Not Provisioned | - | Not Provisioned |
| cat_9k_1.abc.inc | Switches and Hubs | 10.10.22.66 | .../Sydney/NSD5 | FCW2136L0AK | 23 days, 16:53:39.86 | 16.6.1 | packages.conf Tag Golden | Managed | Not Provisioned | - | Not Provisioned |
| cat_9k_2.abc.inc | Switches and Hubs | 10.10.22.70 | .../Sydney/NSD5 | FCW2140L039 | 23 days, 16:50:58.36 | 16.6.1 | packages.conf Tag Golden | Managed | Not Provisioned | - | Not Provisioned |
| cs3850.abc.inc | Switches and Hubs | 10.10.22.69 | .../Sydney/NSD5 | FOC1833X0AR | 23 days, 16:27:28.67 | 16.6.2s | packages.conf Tag Golden | Managed | Not Provisioned | - | Not Provisioned |

SYSTEMS AND METHODS FOR APPLICATION TRAFFIC SIMULATION USING CAPTURED FLOWS

TECHNICAL FIELD

The subject matter of this disclosure relates in general to the field of computer networking, and more particularly, to determining application performance based on network traffic flows.

BACKGROUND

Application performance can vary substantially based on network status. Network impairments such as delay, jitter, packet loss, etc., may have varying impact on hosted applications based on application packet frequency, packet size, connection speed, etc. As a result, it is often difficult to predict impacts of a change in network architecture upon application services. In many cases, where prediction of the impact on an application is attempted, it may be inaccurate because the prediction is typically reliant upon heuristics and/or manual estimations by experts based on experiential knowledge.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3I illustrate examples of graphical user interfaces for a network management system in accordance with some examples;

DESCRIPTION OF EXAMPLE EMBODIMENTS

Figure 1:
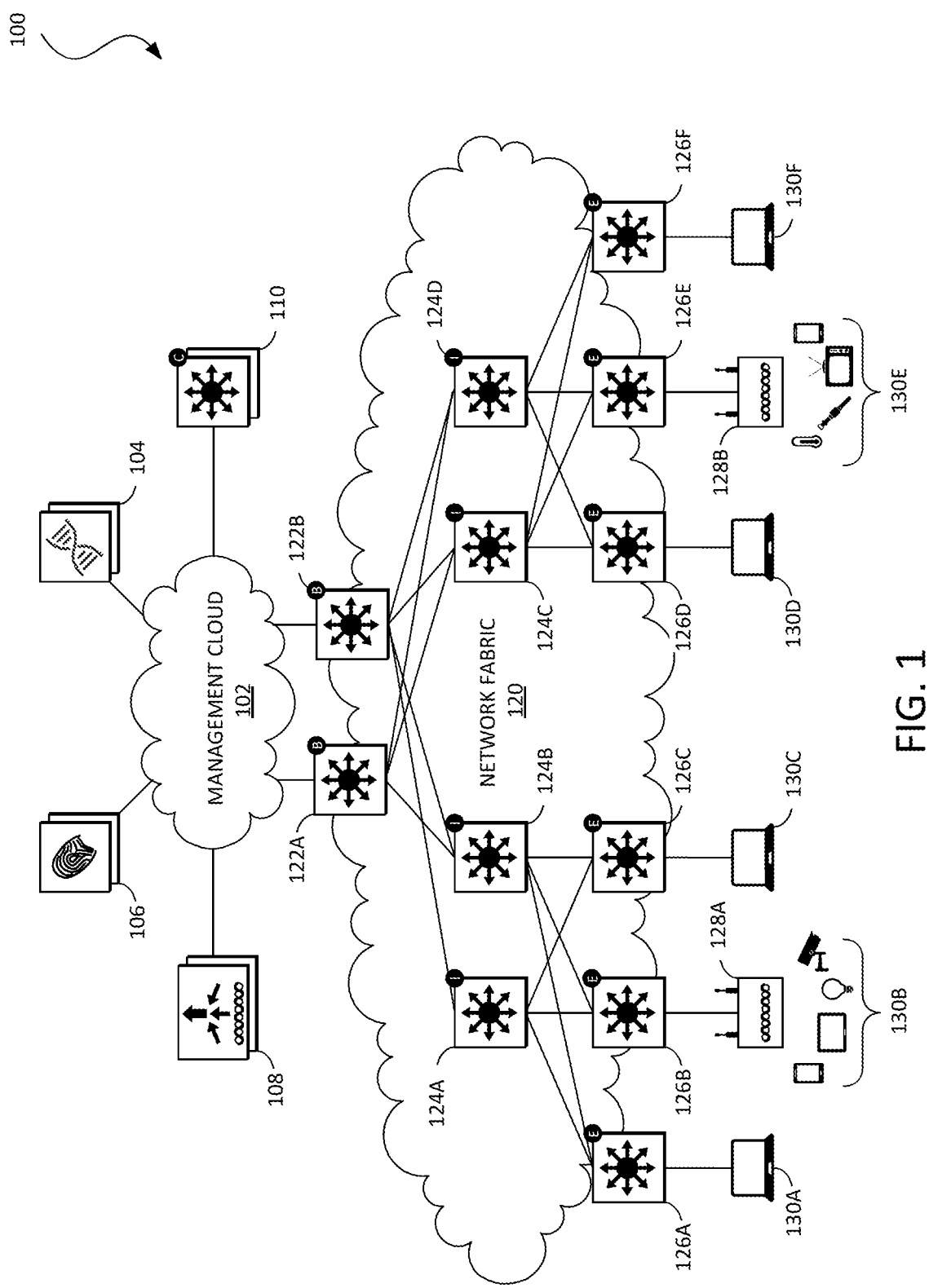
FIG. 1 illustrates an example of a physical topology of an enterprise network in accordance with some examples.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods are provided for predicting an impact upon an application as a result of a change to a network using traffic flows. For example, where impairments such as, for example and without imputing limitation, delay, jitter, packet loss, etc., are anticipated to impact a managed network, a projection of application behavior can be generated to predict, for example, a reduction in application performance as a result. In some examples, various hypothetical scenarios can be explored by using the generated projection and using respective sliders to explore impact on the application of increased or decreased delay, increased or decreased jitter, increased or decreased packet loss, and the like. As a result, a network administrator, for example, can track and predict application performance over a respective network with a substantial degree of confidence.

EXAMPLE EMBODIMENTS

In particular, an application traffic capture and analysis engine may receive network statistics (e.g., from a network management platform, etc.) to generate a projection of how a state of the network, and associated changes in certain statistics such as delay, jitter, packet loss, etc., will effect performance of an application due to impact on traffic flows associated with the application. Further, the application traffic capture and analysis engine can perform simulations based on the generated projections. As a result, changes to a network (e.g., changes in policy, changes in architecture, etc.) can be compared based on simulated respective impacts on application performance.

Actual recorded application traffic and traffic patterns are used for the projections and simulations and, in effect, more closely couple the projections and simulations to actual network information. An intuitive interface may be provided for a network administrator, for example, to use to interact with a simulation, such as by adjusting sliders associated with delay, jitter, packet loss, etc. Further, ongoing network state may be tracked and combined with projections to provide monitoring and alert users ahead of time of a projected reduction in application performance or the like.

In some examples, packet headers associated with a particular application flow are captured (e.g., recorded and/or copied to a data store or the like). Other packet information, such as packet lengths, may also be recorded; however, packet contents (e.g., values related to application state, identifying information, etc.) may not be captured and so anonymization of respective application traffic information can be more easily performed. The captured packet information can be stored either on-site (e.g., at a server serving the respective application) or remotely (e.g., uploaded to remote storage or a cloud store solution, etc.).

As a result, application interaction with the network can be observed and projected in order to predict application behavior (e.g., user experience, time-to-load in response to user requests, etc.) responsive to network modifications. For example, and without imputing limitation, various application-network interactions can be observed, such as packet pacing, number of packets exchanged (between a user and the application), total time to complete a transmission control protocol (TCP) based transaction and display information to a user, application traffic delays over the network, jitter, packet loss, etc. The application-network interactions can then be simulated using a traffic generator or the like.

Consider a credit card payment processing application hosted on a managed network. A transaction may include a credit card swipe via terminal interaction and a web-based application update (e.g., updating payee account, etc.). A network administrator considering a change to the managed network may seek to determine what impact the considered change would have on the credit card payment processing application, such as the speed at which the transaction is processed following the credit card swipe (e.g., payment authorization, confirmation, account update, etc.).

In some examples, a traffic capture analysis and simulation engine may receive traffic flow information related to multiple applications deployed to the managed network, including the credit card payment processing application. Using the traffic flow information, the traffic capture analysis and simulation engine can generate a trend line (e.g., projection) showing that latency has increased by a certain amount (e.g., five milliseconds, etc.) per month over a recent span in tandem with more applications using a shared interface (e.g., link, application programming interface, port, etc.). As a result, using the trend line and profiles associated with the applications (e.g., including packet rate, packet length, etc.), changes to respective application behaviors can be projected out to, for example, a month, three months, a year, etc. by forecasting the latency trend line appropriately.

In addition, the network administrator may simulate hypothetical changes to the managed network in order to observe how the credit card payment processing application would respond. The traffic capture analysis and simulation engine can simulate said hypothetic changes to the network using the captured application traffic. For example, the network administrator may adjust simulated network latency, by interacting with an appropriate slider, and the traffic capture analysis and simulation engine may generate a performance graph reflective of a change to the credit card processing application transaction completion time based on the adjusted latency. As a result, multiple potential changes to a managed network can be simulated to better inform a network administrator, for example, of network changes on an application-specific basis.

The disclosure now turns to a discussion of methods and system which may be used to support the methods and systems discussed above. Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10 am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:
An intent-based network can learn the performance needs of applications and services and adapt the network from end-to-end to achieve specified service levels;
Instead of sending technicians to every office, floor, building, or branch, an intent-based network can discover and identify devices and things as they connect, assign security and micro-segmentation profiles according to established policies, and continuously monitor access point performance to automatically adjust for QoE;
Users can move freely among network segments, mobile device in hand, and automatically connect with the correct security and access privileges;
Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and
Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can include one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can include fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may include a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
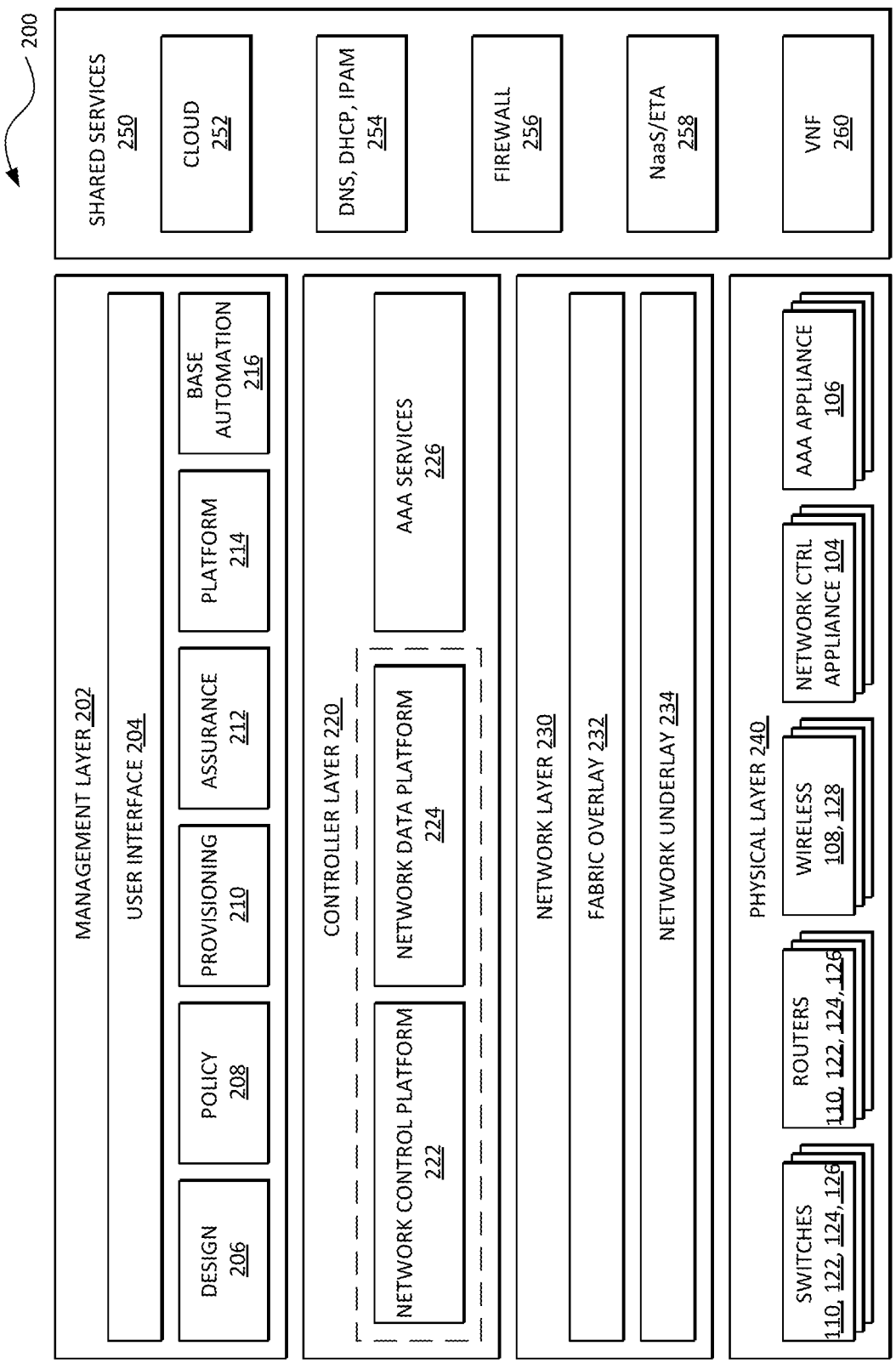
FIG. 2 illustrates an example of a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 216 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network elements to populate into inventory;

An inventory management tool 304 for managing the set of physical and virtual network elements;

A topology tool 306 for visualizing the physical topology of network elements;

An image repository tool 308 for managing software images for network elements;

A command runner tool 310 for diagnosing one or more network elements based on a CLI;

A license manager tool 312 for administering visualizing software license usage in the network;

A template editor tool 314 for creating and authoring CLI templates associated with network elements in a design profile;

A network PnP tool 316 for supporting the automated configuration of network elements;

A telemetry tool 318 for designing a telemetry profile and applying the telemetry profile to network elements; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
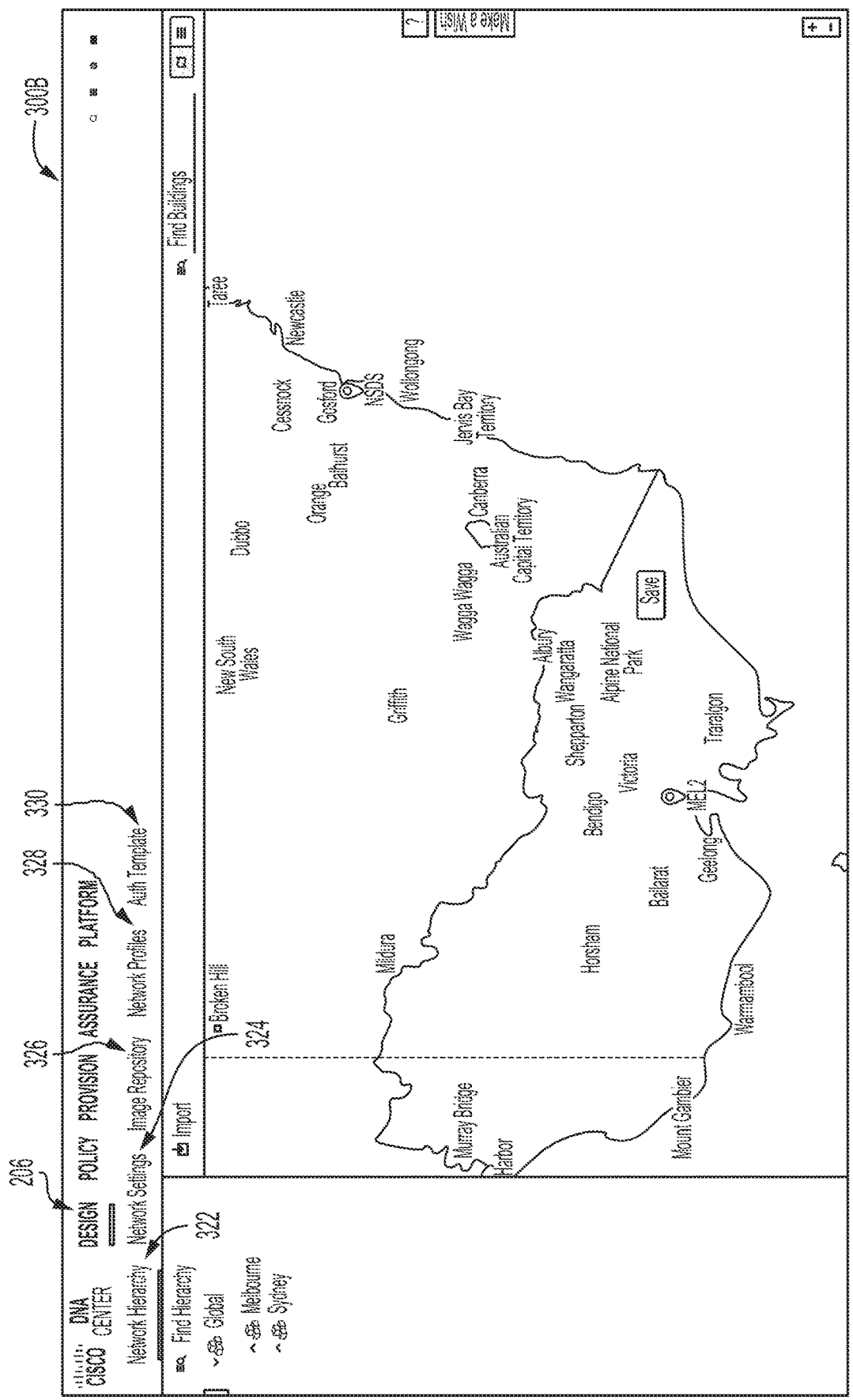

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., QoS classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
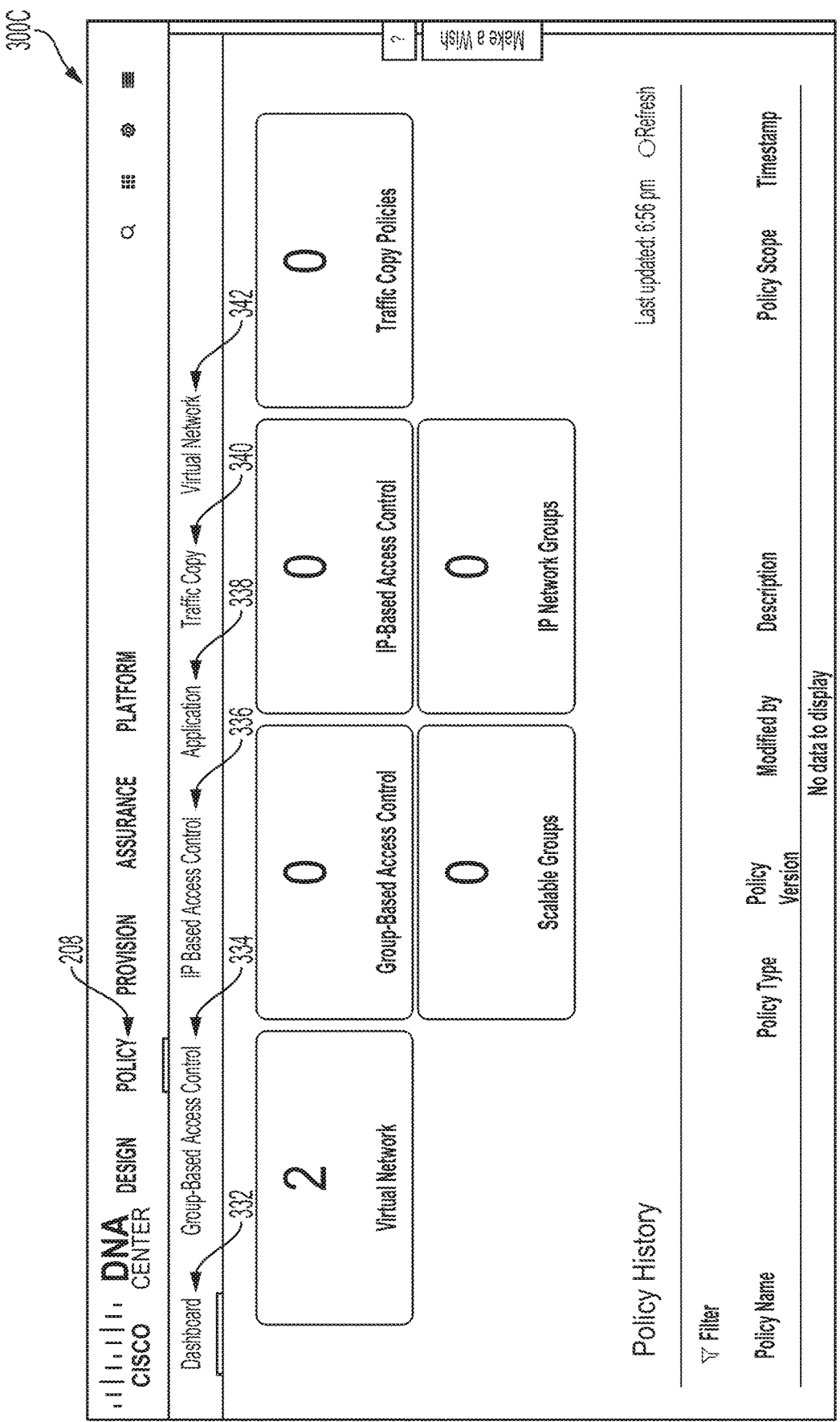

FIG. 3C illustrates a graphical user interface 3000, an example of a landing screen for the policy functions 208. The graphical user interface 3000 can include various tools and workflows for defining network policies. In this example, the policy design tools and workflows include:

A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;

A group-based access control policies tool 334 for managing group-based access controls or SGACLs. A group-based access control policy can define scalable groups and an access contract (e.g., rules that make up the access control policies, such as permit or deny when traffic matches on the policy);

An IP-based access control policies tool 336 for managing IP-based access control policies. An IP-based access control can define an IP network group (e.g., IP subnets that share same access control requirements) and an access contract;

An application policies tool 338 for configuring QoS for application traffic. An application policy can define application sets (e.g., sets of applications that with similar network traffic needs) and a site scope (e.g., the site to which an application policy is defined);

A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

FIG. 3D illustrates a graphical user interface 300D, an example of a landing screen for the provisioning functions 210. The graphical user interface 300D can include various tools and workflows for deploying the network. In this example, the provisioning tools and workflows include:

A device provisioning tool 344 for assigning devices to the inventory and deploying the required settings and policies, and adding devices to sites; and A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
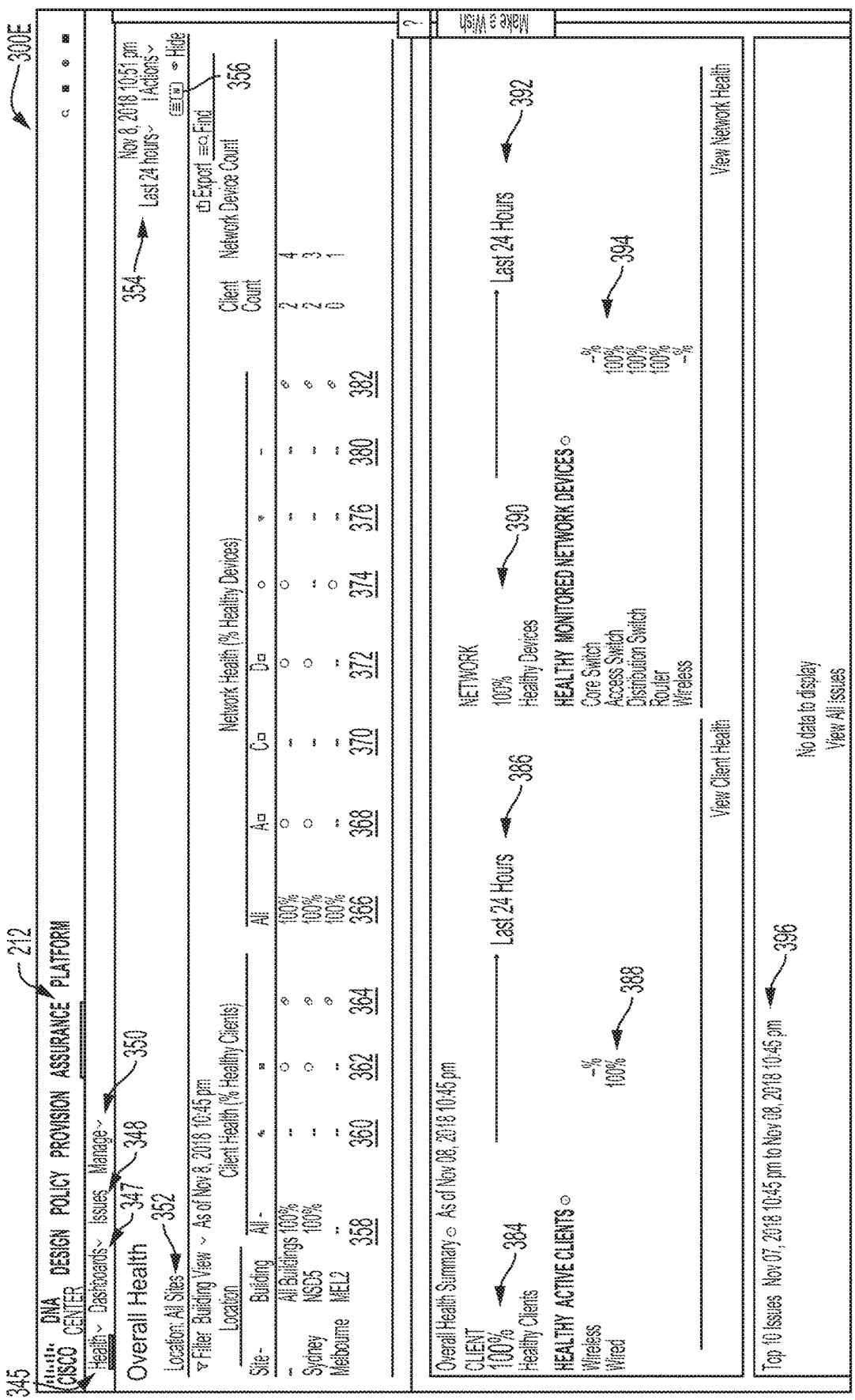

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 345 for providing a global view of the enterprise network, including network infrastructure devices and endpoints. The user interface element (e.g., drop-down menu, a dialog box, etc.) associated with the health overview tool 345 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 347 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 352 can enable a user to view the overall health of specific sites (e.g., as defined via the network hierarchy tool 322) and/or network domains (e.g., LAN, WLAN, WAN, data center, etc.). The time period selection user interface element 354 can enable display of the overall health of the network over specific time periods (e.g., last 3 hours, last 24 hours, last 7 days, custom, etc.). The view type user interface element 356 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments. For example, different and/or additional user interface elements can be included in column 382 for still further drilling down to the health of the network infrastructure services and/or devices.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
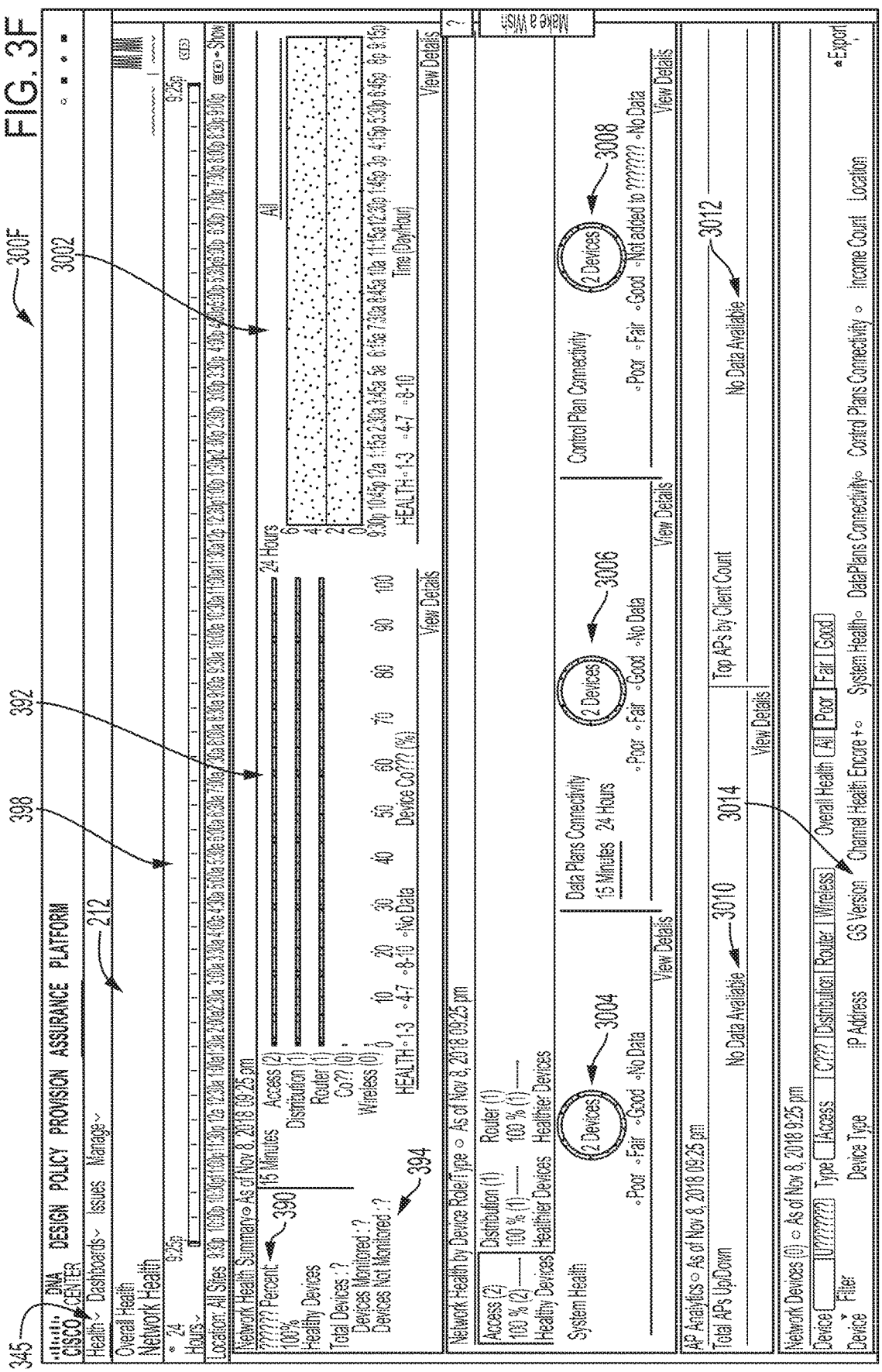

FIG. 3F illustrates a graphical user interface 300F, an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices via user interface element 390, a percentage value in this example, the color coded trend charts 392 indicating that percentage by device type, the breakdown of the number of healthy network infrastructure devices by device type, here via user interface element 394 displaying a list of paired health percentage values and respective device types, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
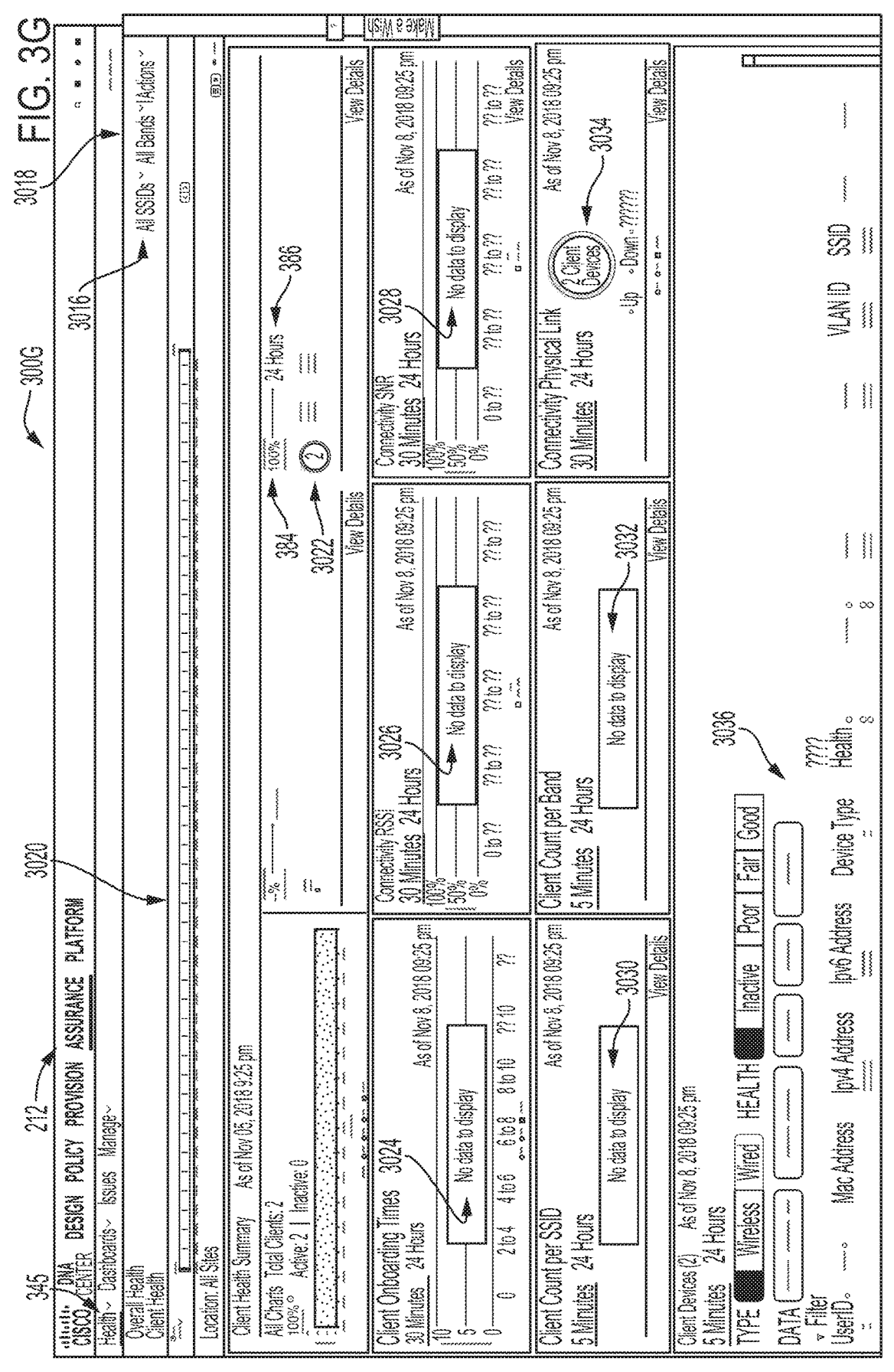

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the timeline slider 398.

The graphical user interface 300G can also include a client health summary user interface element that provides similar information to that shown in the graphical user interface 300E, such as the number of healthy clients as a percentage value, via user interface element 384, and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:

Client onboarding times 3024;
Received Signal Strength Indications (RSSIs) 3026;
Connectivity signal-to-noise ratios (SNRs) 3028;
Client counts per SSID 3030;
Client counts per band frequency 3032;
DNS requests and response counters (not shown); and
Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
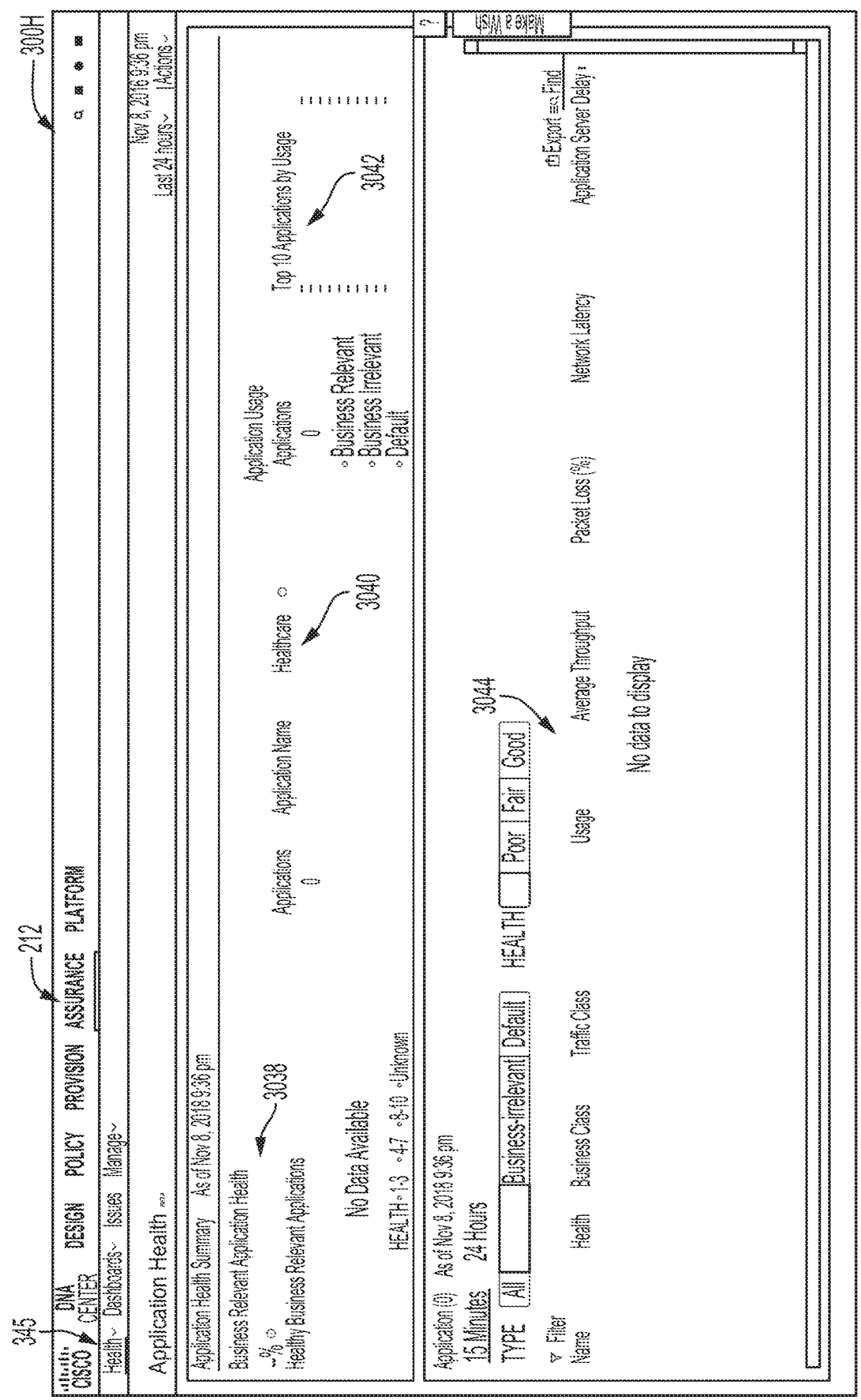

FIG. 3H illustrates a graphical user interface 300H, an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
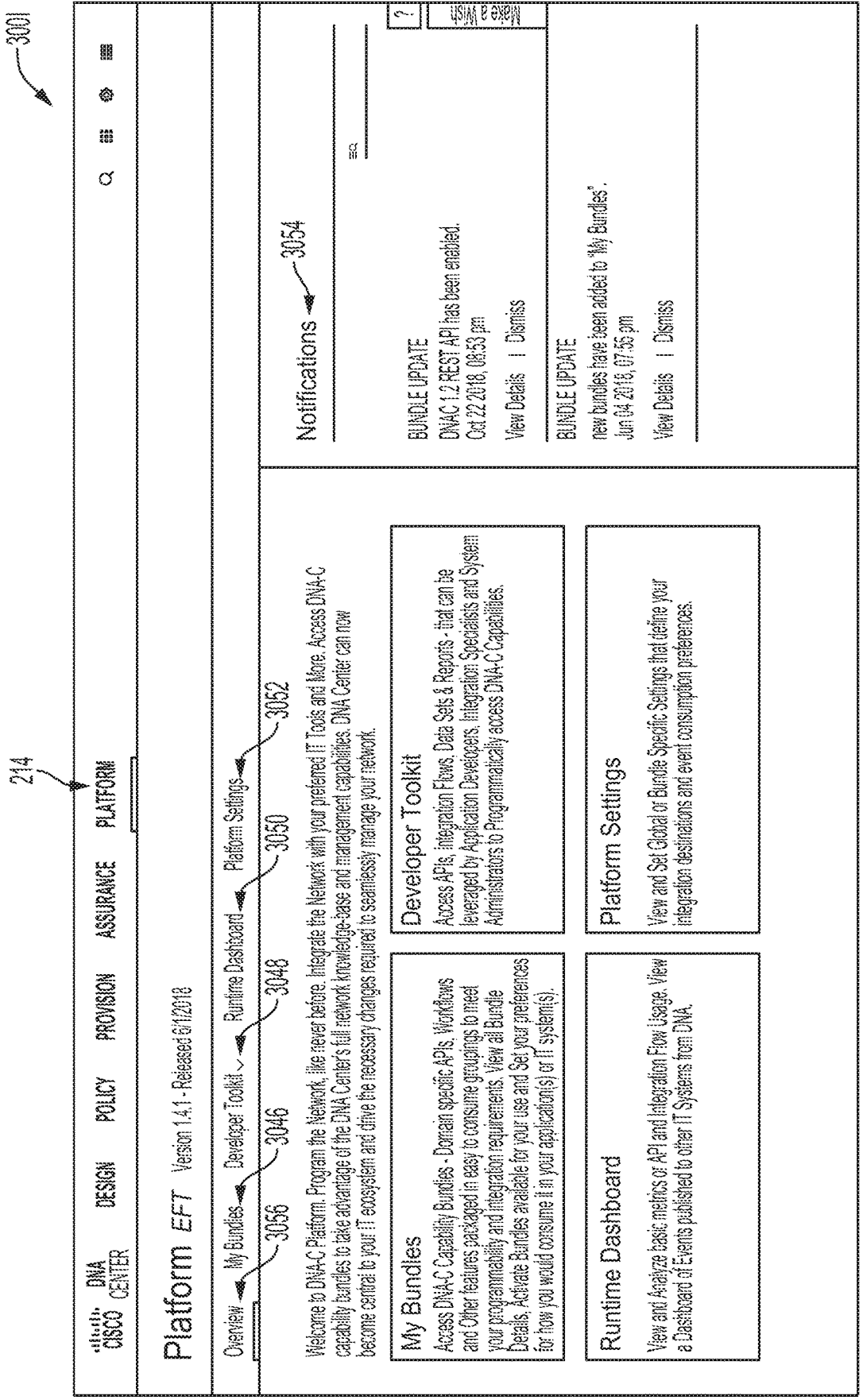

FIG. 3I illustrates an example of a graphical user interface 300I, an example of a landing screen for the platform functions 214. The graphical user interface 300I can include various tools and workflows for integrating with other technology systems. In this example, the platform integration tools and workflows include:

A bundles tool 3046 for managing packages of domain-specific APIs, workflows, and other features for network programming and platform integration;

A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;

A runtime dashboard 3050 for viewing and analyzing basic metrics or API and integration flow usage;

A platform settings tool 3052 to view and set global or bundle-specific settings that define integration destinations and event consumption preferences; and A notifications user interface element 3054 for presenting notifications regarding the availability of software updates, security threats, and so forth.

Returning to FIG. 2, the controller layer 220 can include subsystems for the management layer 202 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 222 can provide the design functions 206, the provisioning functions 208, the provisioning functions 210, the assurance functions 212, the platform functions 214, and/or the base automation functions 216, etc. In addition, the network control platform 222 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services layer 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller appliance(s) 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can include network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
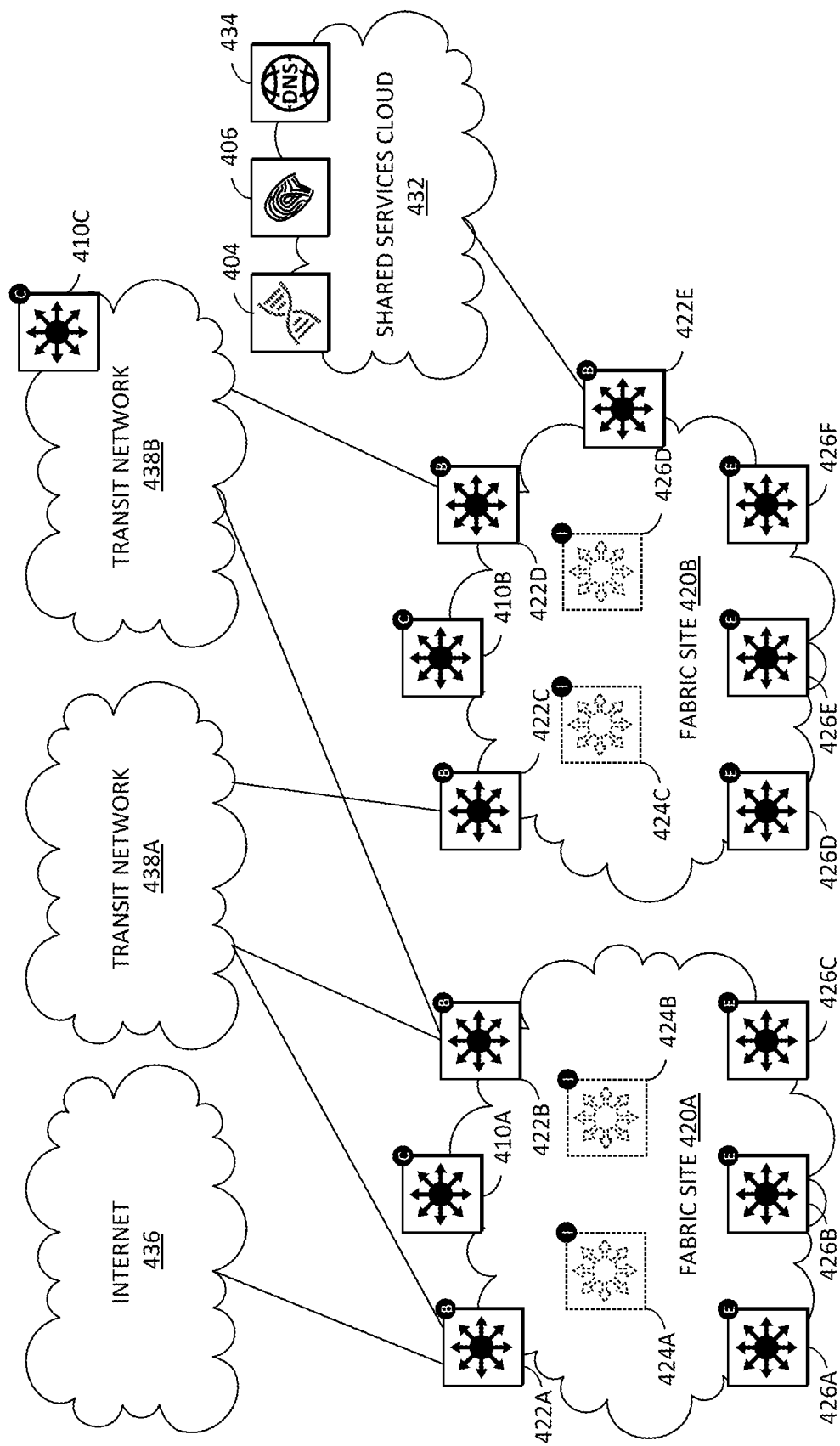
FIG. 4 illustrates an example of a physical topology for a multi-site enterprise network in accordance with some examples.

FIG. 4 illustrates an example of a physical topology for a multi-site enterprise network 400. In this example, the network fabric includes fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be capable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can include one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5A:
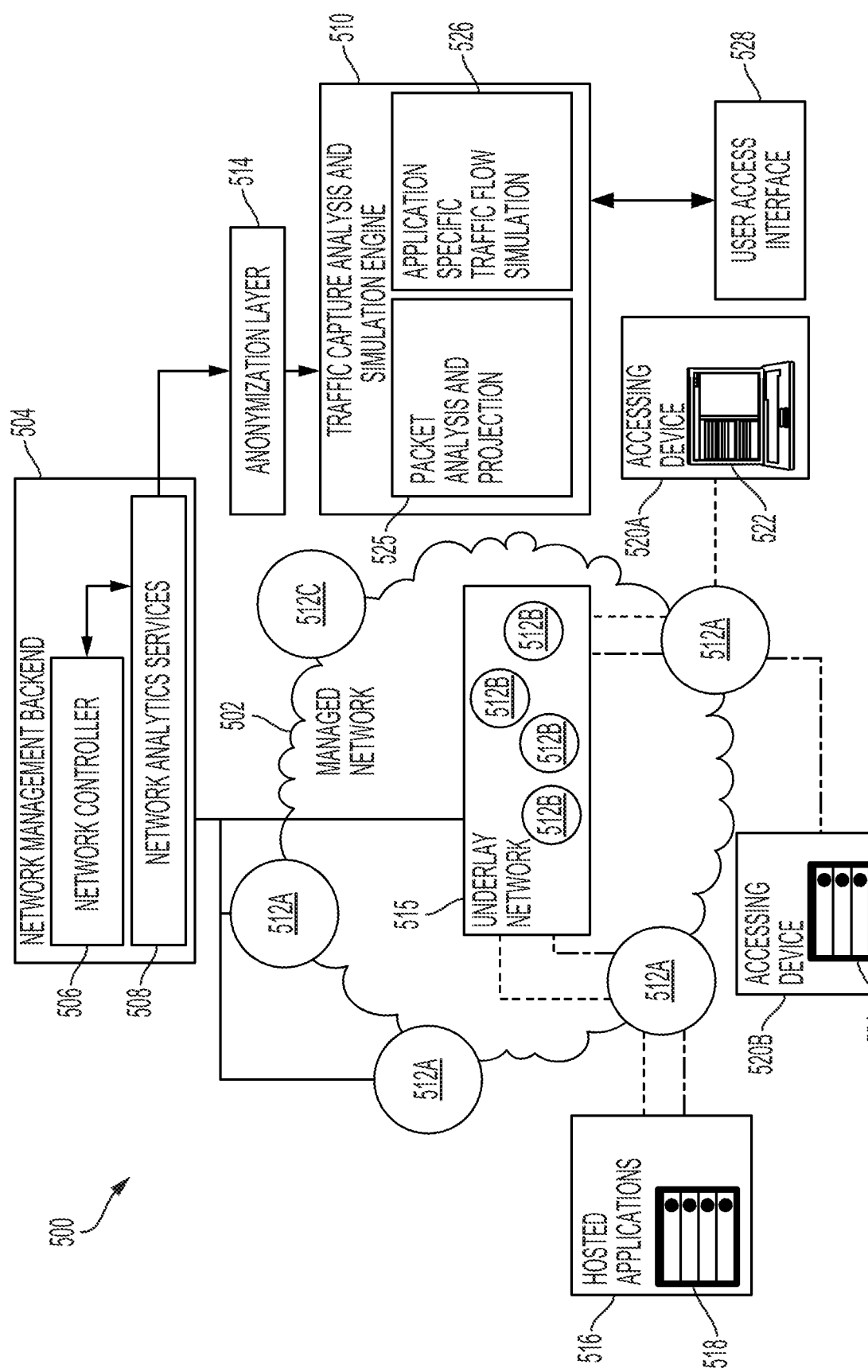
FIG. 5A illustrates an example of an operating environment in accordance with some examples.

FIG. 5A illustrates an operating environment 500 for capturing application traffic flows and using the captured flows for simulation and analysis. In particular, operating environment 500 includes traffic capture analysis and simulation engine 510 which may receive network traffic information from a network management backend 504 in communication with a managed network 502 over which network traffic passes between hosted applications 516 and one or more accessing devices 520A-B.

Managed network 502 includes fabric edge nodes 512A and an underlay network 515 including underlay components (e.g., internal switches, routers, etc.) 512B. Traffic traversing managed network 502 is received by one of fabric edge nodes 512A from an origination address and proceeds across managed network 502 via underlay network 515 and to a destination. Managed network 502 is overseen by network management backend 504, which includes a network controller 506 and a network analytics services 508. For example, network management backend 504 may include, or be substantially similar to, network control platform 222 described above. In general, network management backend may, among other things, retrieve traffic data and component information from fabric edge nodes 512A, underlay components 512B, and other components making up managed network 502. Here, network management backend 504 provides application-specific traffic to traffic capture analysis and simulation engine 510. For example, traffic capture analysis and simulation engine 510 may request traffic information related to a particular application or applications via an API call or the like to network management backend 504.

Application-based traffic may come from multiple applications and/or multiple accessing devices 520A-B. For example, a server 518 hosts one or more hosted applications 516, which generates traffic for accessing device 520B, including an accessing server 524, and accessing device 520A, including a laptop 522. In some examples, an accessing device may be, for example and without imputing limitation, a mobile device (e.g., a tablet, wearable device, etc.), embedded computer (e.g., vehicle console, etc.), smartphone, desktop computer, etc. Application traffic may have varying characteristics based on the respective application, network policies, network architecture, accessing device, and the like, as indicated by differing dashed lines of FIG. 5A representing application traffic traversing managed network 502 between hosted applications 516 and accessing device 520A and accessing device 520B respectively.

Traffic capture analysis and simulation engine 510 includes a packet analysis and projection process 525 as well as an application specific traffic flow simulation process 526. Further, an anonymization layer 514 anonymizes traffic data as it is received by traffic capture analysis and simulation engine 510. While depicted here in isolation, anonymization layer 514 may be a part of network management backend 504 and/or traffic capture analysis and simulation engine 510 in various examples. Traffic capture analysis and simulation engine 510 generates application performance projections and/or application specific simulations which may be provided to a user via a user access interface 528. User access interface 528 includes components (discussed below in reference to FIG. 5D) which an accessing user (e.g., a network administrator, IT personnel, etc.) may use to observe the impact of hypothetical changes to managed network 502 on one or more hosted applications. As a result, a user can observe a simulated impact of, for example and without imputing limitation, modifications to a respective network architecture, such as security policy changes or underlay expansion, before implementing said modifications.

Figure 5B:
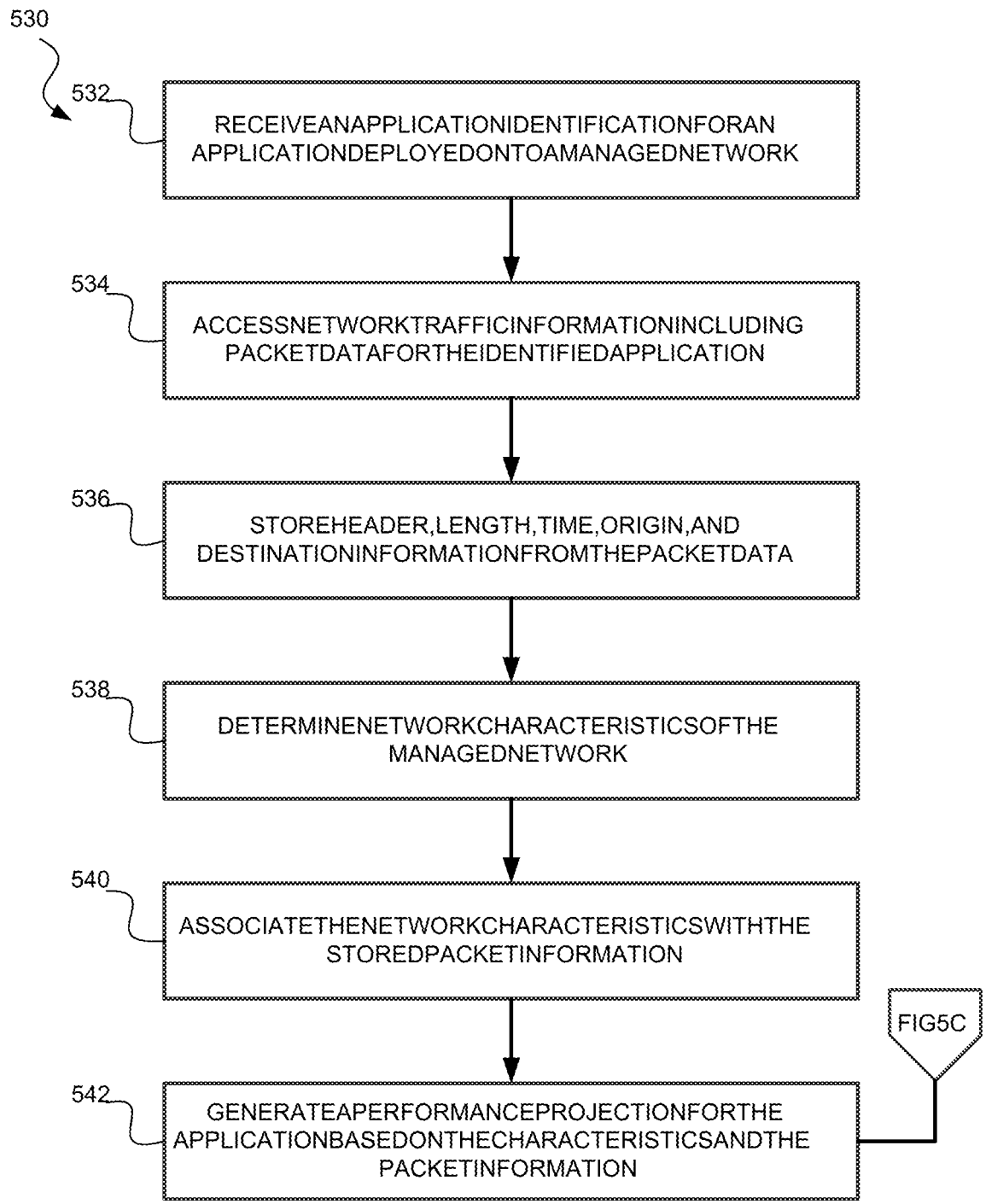
FIG. 5B is a flowchart of an example method for generating application performance projections in accordance with some examples.

FIG. 5B illustrates a method 530 for generating performance projections for applications based on application traffic flow data. In some examples, method 530 may be performed by traffic capture analysis and simulation engine 510 and/or packet analysis and projection process 525 discussed above.

At step 532, an application identification for an application deployed onto a managed network is received. In particular, the application identification may identify an application or application type for generating a performance projection. In some examples, the application identification may be received from a user via a graphical user interface (GUI), through a command line interface (CLI), or the like. In some examples, the application identification may be received from an upstream process, such as part of an extended workflow (e.g., autocorrecting workflows, performance alert workflows, etc.).

At step 534, network traffic information is accessed by, for example, traffic capture analysis and simulation engine 510. The accessed network information includes packet data for the identified application. In some examples, traffic capture analysis and simulation engine 510 accesses the network information by providing a request for network traffic data associated with the identified application to a network management platform which may retrieve and/or store said information.

At step 536, header, length, time, origin, and destination information from the packet data are stored. In general, application performance projections and simulations can be generated without packet contents. The packet headers, lengths, times, origins, and destinations can be used to build a history of application-specific traffic information which may then be used to generate projections based on the historical data.

At step 538, network characteristics of the managed network are determined. The determined network characteristics may be provided by the network manager and/or network controller. The network characters can include, for example and without imputing limitation, latency, packet loss, policy, architecture, path, and other network information.

At step 540, the network characteristics are associated with the stored packet information. For example, the network characteristics may be associated via shared timing information. As a result, the associated data can be used to perform analysis and generate projections. At step 542, a performance projection is generated for the application based on the characteristics and the packet information. In some examples, the projection may be provided to a user through a GUI. In some examples, the projection may be used to further execute simulations of hypothetical network characteristics and/or changes.

Figure 5C:
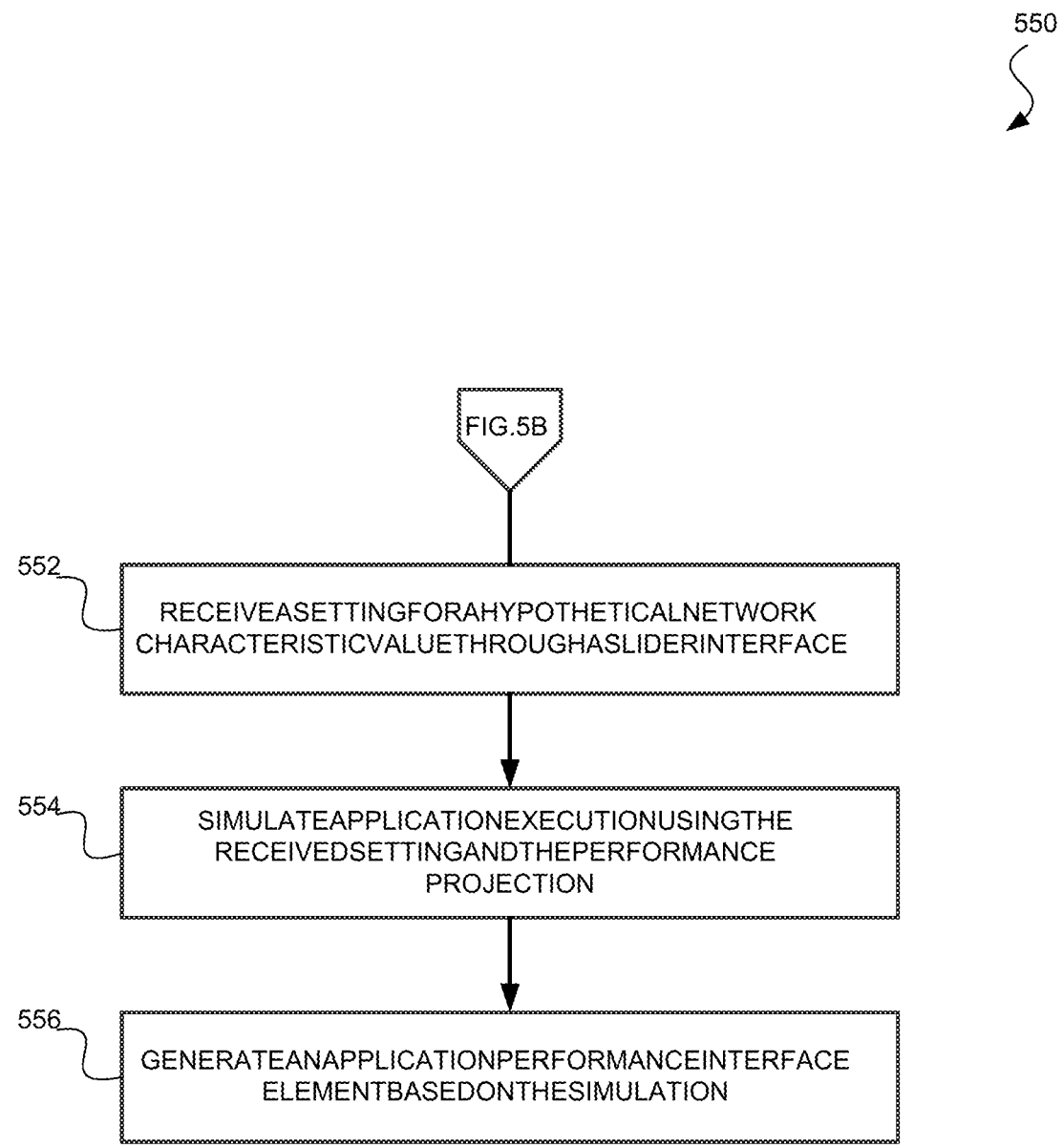
FIG. 5C is a flowchart of an example method for simulating application performance in accordance with some examples.

FIG. 5C depicts a method 550 for simulating hypothetical network characteristics and/or changes. In particular, method 550 is performed following method 530 discussed above. While method 550 is depicted following method 530, it is understood that method 550 may be performed in tandem with method 530, at a later time, or at some other time not depicted and that the sequence depicted in this disclosure is for explanatory purposes only and should not be taken to be unduly limiting.

At step 552, a setting for a hypothetical network characteristic value is received through a slider interface. Network characteristics can include, for example and without imputing limitation, latency, jitter, packet loss, etc.

At step 554, application execution is simulated using the received setting and the performance projection of method 530 discussed above. In particular, traffic flows across a managed network reflective of the received network characteristic are simulated to determine application behavior in said simulated network. In one example, the simulation includes calculating performance values such as aggregated values, specific performance values (e.g., transaction completion times, etc.) or the like by applying one or more performance projections to the received setting (e.g., calculating a value along a curve, etc.).

At step 556, an application performance interface element based on the simulation is generated. In one example, the interface element may be a bar or meter depicting an aggregated performance value. In some examples, the interface element may be a bar chart depicting various performance values such as aggregate values, specific performance values (e.g., transaction completion times, etc.) or the like.

Figure 5D:
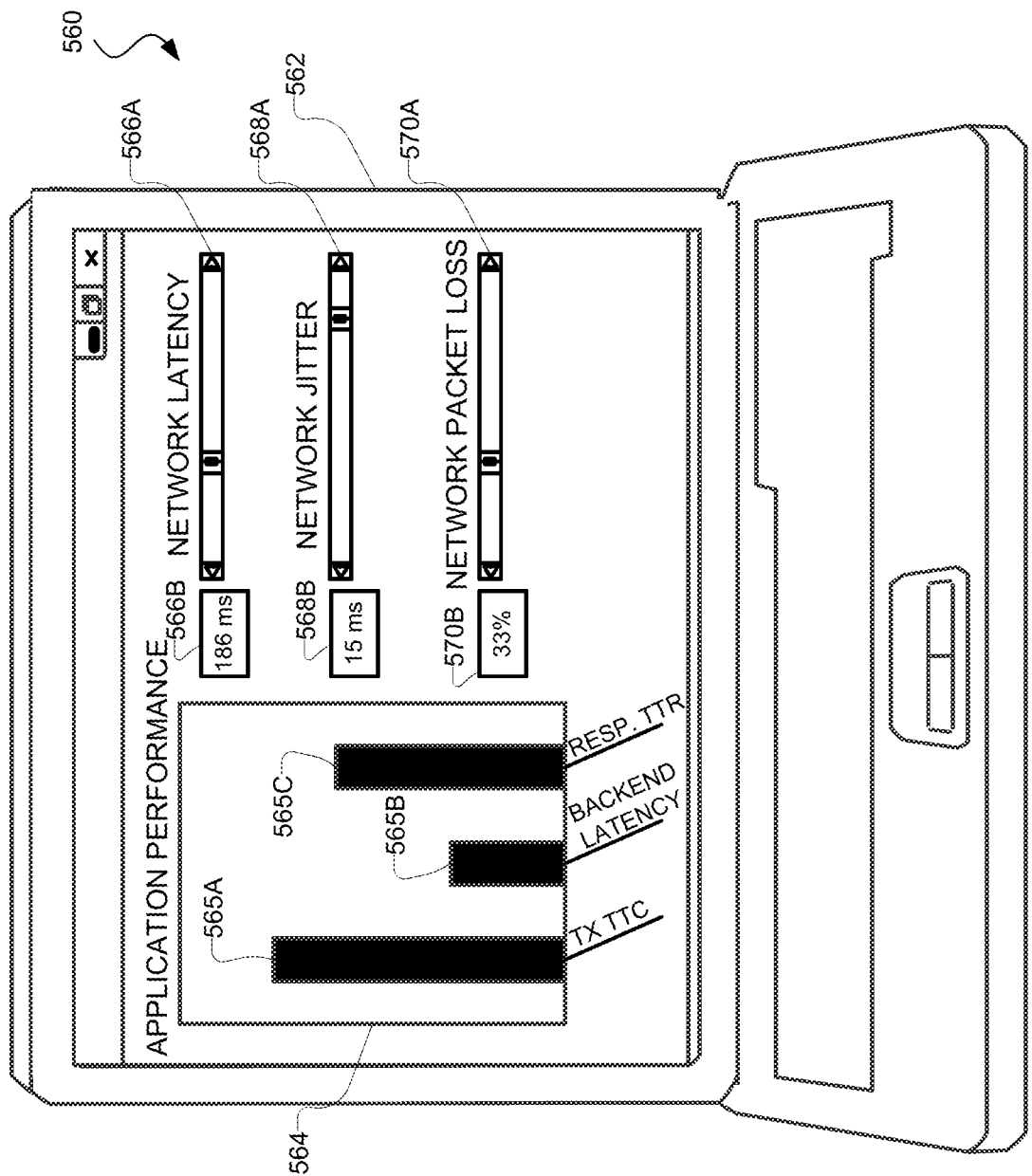
FIG. 5D illustrates an example graphical user interface for simulating application performance in accordance with some examples.

FIG. 5D depicts an example of a graphical user interface (GUI) 560 displayed on a laptop 562. GUI 560 may be, for example, user access interface 528 discussed above. In some examples, GUI 560 may be displayed on devices other than laptop 562, such as, for example and without imputing limitation, a desktop computer, smartphone, tablet computer, mobile device, etc.

In particular, an application performance chart 564 displays key metrics 565A-C for a simulated application. Here, a transaction time to complete bar 565A shows a simulated time to complete a transaction for a simulated application and traffic flow. The transaction time to complete is the duration of time between a transaction initiation and its completion and may partially depend on, for example, backend latencies, processing speed, network connection, and the like. A backend latency bar 565B shows a simulated backend latency based on the simulated application and traffic flow and may include, for example, backend service meshes and the like and so be partially dependent upon network characteristics, processing speeds, and the like. A response to receipt bar 565C shows a simulated time for a completed response to be received by an application user. For example, once a hosted application has generated a result for a transaction, the time taken for the generated result to be received by the application user from the hosted application may vary based on network characteristics. While specific measures are depicted, it is understood that various other measures related to application performance and simulated traffic flows may be displayed in application performance chart 564 or elsewhere in GUI 560.

Key metrics 565A-C (e.g., transaction time to complete bar 565A, etc.) may change based on values input through sliders 566A, 568A, 570A or input fields 566B, 568B, 570B. Sliders 566A, 568A, 570A and respective input fields 566B, 568B, 570B may be linked so each displays a respective numeric or location value reflective of the other. For example, where slider 566A is positioned to a far left location or a far right location, input field 566B may update to display a minimum or maximum numeric value respectively.

In particular, slider 566A and input field 566B may adjust a simulated network latency. Slider 568A and input field 568B may adjust a simulated network jitter. Slider 570A and input field 570B may adjust a simulated network packet loss. By adjusting sliders 566A, 568A, 570A and respective input fields 566B, 568B, 570B, a user may observe the impact of simulated network changes on the performance of an application. As a result, informed network adjustments can be made while minimizing post-implementation corrections and/or adjustments.

Figure 6A:
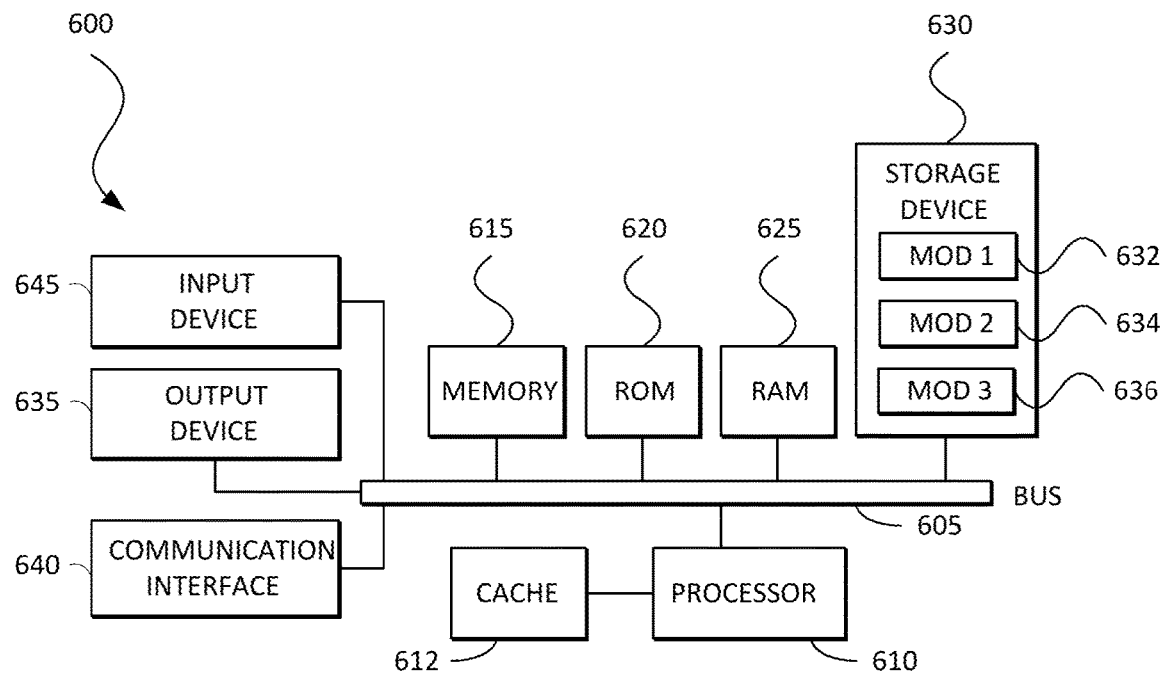
FIGS. 6A and 6B illustrate examples of systems in accordance with some examples.
Figure 6B:
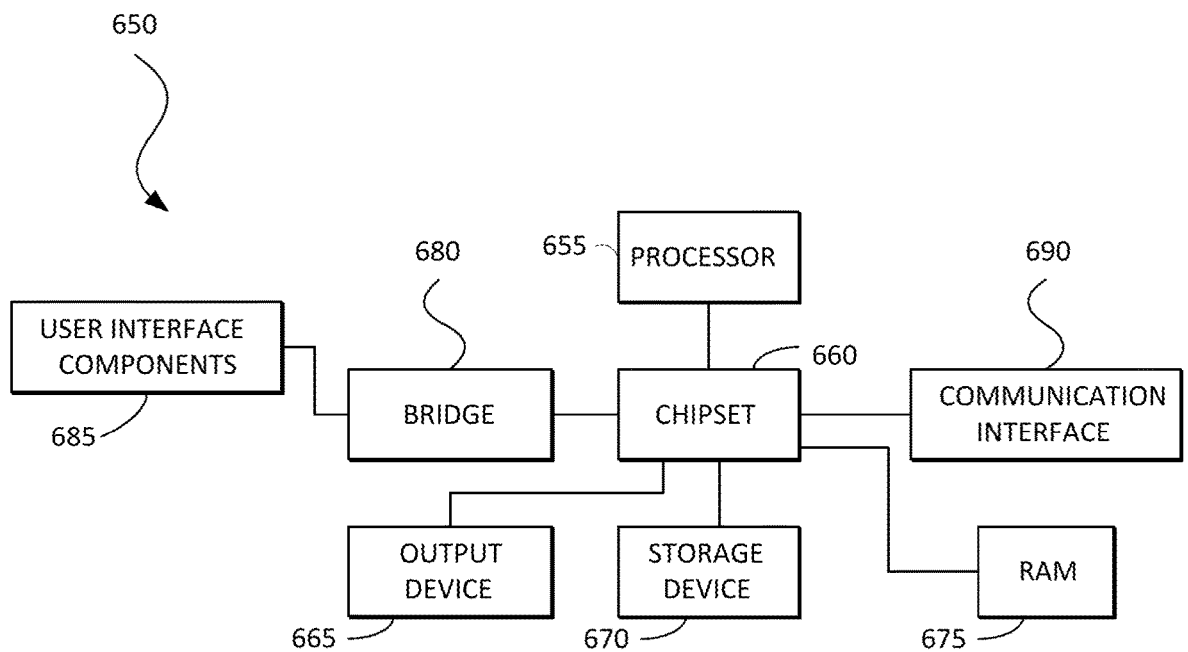

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

A series of statements follows to provide further understanding of the systems and methods of the disclosure:

Statement 1: A method for simulating a traffic flow includes receiving packets of network traffic associated with an application, determining a trend line from received packets, the trend line corresponding to performance of the application, receiving a change selection from a graphical user interface element comprising an interactable slider, and generating a simulated application latency based on the change selection and the trend line.

Statement 2: The method of Statement 1 may further include capturing headers of the received packets, the headers including origin, destination, timing information for respective packets, wherein the trend line is determined based on the timing information and associated with one or more network configuration changes.

Statement 3: The method of any of the preceding Statements may further include the change selection including one of a change in network latency, jitter, or packet loss.

Statement 4: The method of any of the preceding Statements may further include the performance of the application including a time to complete a transaction executed by the application.

Statement 5: The method of any of the preceding Statements may further include the packets being received from a network management tool.

Statement 6: The method of any of the preceding Statements may further include anonymizing the received packets, the anonymized packets excluding packet data content.

Statement 7: The method of any of the preceding Statements may further include generating a graphical user interface based on the simulated application latency, the graphical user interface including an application performance chart and one or more sliders corresponding to the change selection, wherein the application performance chart updates a display of application performance metrics based on adjustments to the one or more sliders and the simulated application.

Statement 8: A system for simulating a traffic flow includes one or more processors, and a memory including instructions for the one or more processors to receive packets of network traffic associated with an application, determine a trend line from received packets, the trend line corresponding to performance of the application, receive a change selection from a graphical user interface element including an interactable slider, and generate a simulated application latency based on the change selection and the trend line.

Statement 9: The system of preceding Statement 8 may further include the memory further including instructions to capture headers of the received packets, the headers including origin, destination, timing information for respective packets, wherein the trend line is determined based on the timing information and associated with one or more network configuration changes.

Statement 10: The system of any of preceding Statements 8-9 may further include the change selection including one of a change in network latency, jitter, or packet loss.

Statement 11: The system of any of preceding Statements 8-10 may further include the performance of the application including a time to complete a transaction executed by the application.

Statement 12: The system of any of preceding Statements 8-11 may further include the packets being received from a network management tool.

Statement 13: The system of any of preceding Statements 8-12 may further include the memory further including instructions to anonymize the received packets, the anonymized packets excluding packet data content.

Statement 14: The system of any of preceding Statements 8-13 may further include the memory further including instructions to generate a graphical user interface based on the simulated application latency, the graphical user interface including an application performance chart and one or more sliders corresponding to the change selection, wherein the application performance chart updates a display of application performance metrics based on adjustments to the one or more sliders and the simulated application.

Statement 15: A non-transitory computer-readable medium storing instructions that, when executed by one or more processors, may cause the one or more processors to receive packets of network traffic associated with an application, determine a trend line from received packets, the trend line corresponding to performance of the application, receive a change selection from a graphical user interface element including an interactable slider, the change including one or more of a change in network latency, jitter, or packet loss, and generate a simulated application latency based on the change selection and the trend line.

Statement 16: The non-transitory computer-readable medium of preceding Statement 15 may further store instructions to capture headers of the received packets, the headers including origin, destination, timing information for respective packets, wherein the trend line is determined based on the timing information and associated with one or more network configuration changes.

Statement 17: The non-transitory computer-readable medium of any of preceding Statements 15-16 may further include the performance of the application including a time to complete a transaction executed by the application.

Statement 18: The non-transitory computer-readable medium of any of preceding Statements 15-17 may further include the packets being received from a network management tool.

Statement 19: The non-transitory computer-readable medium of any of preceding Statements 15-18 may further store instructions to anonymize the received packets, the anonymized packets excluding packet data content.

Statement 20: The non-transitory computer-readable medium of any of preceding Statements 15-19 may further store instructions to generate a graphical user interface based on the simulated application latency, the graphical user interface including an application performance chart and one or more sliders corresponding to the change selection, wherein the application performance chart updates a display of application performance metrics based on adjustments to the one or more sliders and the simulated application.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for simulating a traffic flow, the method comprising:
    receiving packets of network traffic over a network and associated with an application;
    determining characteristics of the network;
    associating the characteristics of the network with the packets of network traffic;
    determining a trend line from the association between the characteristics of the network with the packets of network traffic, the trend line corresponding to performance of the application;
    receiving a change selection of the characteristics of the network from a graphical user interface element; and
    generating a simulated application latency based on the change selection of the characteristics of the network and the trend line.

2. The method of claim 1, further comprising capturing headers of the received packets, the headers comprising origin, destination, timing information for respective packets, wherein the trend line is determined based on the timing information and associated with one or more network configuration changes.

3. The method of claim 1, wherein the change selection includes one of a change in network latency, jitter, or packet loss.

4. The method of claim 1, wherein the performance of the application comprises a time to complete a transaction executed by the application.

5. The method of claim 1, wherein the packets are received from a network management tool.

6. The method of claim 1, further comprising anonymizing the received packets, the anonymized packets excluding packet data content.

7. The method of claim 1, further comprising generating a graphical user interface based on the simulated application latency, the graphical user interface comprising an application performance chart and one or more sliders corresponding to the change selection, wherein the application performance chart updates a display of application performance metrics based on adjustments to the one or more sliders and the simulated application.

8. A system for simulating a traffic flow, the system comprising:
one or more processors; and
a memory comprising instructions for the one or more processors to:
receive packets of network traffic over a network and associated with an application;
determine characteristics of the network;
associate the characteristics of the network with the packets of network traffic;
determine a trend line from the association between the characteristics of the network with the packets of network traffic, the trend line corresponding to performance of the application;
receive a change selection of the characteristics of the network from a graphical user interface element; and
generate a simulated application latency based on the change selection of the characteristics of the network and the trend line.

9. The system of claim 8, wherein the memory further comprises instructions to capture headers of the received packets, the headers comprising origin, destination, timing information for respective packets, wherein the trend line is determined based on the timing information and associated with one or more network configuration changes.

10. The system of claim 8, wherein the change selection includes one of a change in network latency, jitter, or packet loss.

11. The system of claim 8, wherein the performance of the application comprises a time to complete a transaction executed by the application.

12. The system of claim 8, wherein the packets are received from a network management tool.

13. The system of claim 8, wherein the memory further comprises instructions to anonymize the received packets, the anonymized packets excluding packet data content.

14. The system of claim 8, wherein the memory further comprises instructions to generate a graphical user interface based on the simulated application latency, the graphical user interface comprising an application performance chart and one or more sliders corresponding to the change selection, wherein the application performance chart updates a display of application performance metrics based on adjustments to the one or more sliders and the simulated application.

15. A non-transitory computer-readable medium storing instructions that, when executed by one or more processors, cause the one or more processors to:
receive packets of network traffic over a network and associated with an application;
determine characteristics of the network;
associate the characteristics of the network with the packets of network traffic;
determine a trend line from the association between the characteristics of the network with the packets of network traffic, the trend line corresponding to performance of the application;
receive a change selection of the characteristics of the network from a graphical user interface element, the change including one or more of a change in network latency, jitter, or packet loss; and
generate a simulated application latency based on the change selection of the characteristics of the network and the trend line.

16. The non-transitory computer-readable medium of claim 15, further storing instructions to capture headers of the received packets, the headers comprising origin, destination, timing information for respective packets, wherein the trend line is determined based on the timing information and associated with one or more network configuration changes.

17. The non-transitory computer-readable medium of claim 15, wherein the performance of the application comprises a time to complete a transaction executed by the application.

18. The non-transitory computer-readable medium of claim 15, wherein the packets are received from a network management tool.

19. The non-transitory computer-readable medium of claim 15, further storing instructions to anonymize the received packets, the anonymized packets excluding packet data content.

20. The non-transitory computer-readable medium of claim 15, further storing instructions to generate a graphical user interface based on the simulated application latency, the graphical user interface comprising an application performance chart and one or more sliders corresponding to the change selection, wherein the application performance chart updates a display of application performance metrics based on adjustments to the one or more sliders and the simulated application.

* * * * *